(12) United States Patent
Holmes

(10) Patent No.: US 12,468,280 B2
(45) Date of Patent: Nov. 11, 2025

(54) STEP-BASED SYSTEMS WITH MULTIPLE ACTUATORS

(71) Applicant: MAREL LIMITED, Essex (GB)

(72) Inventor: Ian Holmes, Essex (GB)

(73) Assignee: MAREL LIMITED, Essex (GB)

( * ) Notice: Subject to any disclaimer, the term of this patent is extended or adjusted under 35 U.S.C. 154(b) by 241 days.

(21) Appl. No.: 17/925,383

(22) PCT Filed: May 20, 2021

(86) PCT No.: PCT/GB2021/051228
§ 371 (c)(1),
(2) Date: Nov. 15, 2022

(87) PCT Pub. No.: WO2021/234397
PCT Pub. Date: Nov. 25, 2021

(65) Prior Publication Data
US 2023/0288901 A1    Sep. 14, 2023

(30) Foreign Application Priority Data
May 22, 2020   (EP) .................................. 20176086

(51) Int. Cl.
*G05B 19/402*   (2006.01)
(52) U.S. Cl.
CPC .. *G05B 19/402* (2013.01); *G05B 2219/37333* (2013.01)
(58) Field of Classification Search
CPC . G05B 9/00; G05B 7/00; G05B 23/00; G05B 19/40; G05B 19/402;
(Continued)

(56) References Cited

U.S. PATENT DOCUMENTS

| 4,156,170 A | 5/1979 | Strunc |
| 5,574,351 A | 11/1996 | Jacobson et al. |

(Continued)

FOREIGN PATENT DOCUMENTS

| CN | 107852118 A | 3/2018 |
| DE | 102015107583 A1 | 11/2016 |

(Continued)

OTHER PUBLICATIONS

Search Report from corresponding European Application No. 20176086.5, Feb. 15, 2021.

(Continued)

*Primary Examiner* — Kidest Bahta
(74) *Attorney, Agent, or Firm* — Workman Nydegger

(57) ABSTRACT

In a production line where various operations have to be performed on a unit that is conveyed through or assembled in the line, a control system for a set of actuators is provided that operates in discrete steps to carry out movement in a machine and is required to synchronize at points in speed and position. A controller is provided for each actuator, and a coordinator configured to determine or receive the position of the actuators and to receive or generate data concerning a waypoint, being positions and corresponding speeds for the actuators. The controllers are configured to change the speed of the actuators, and the coordinator starts the movement of at least one actuator on the basis of a point reached by another actuator, so as to achieve the desired synchronization.

15 Claims, 5 Drawing Sheets

(58) Field of Classification Search
CPC . G05B 2219/37333; H02P 8/40; H02P 31/00; H02P 1/00; H02P 5/00; H02P 4/00; H02P 2209/00
See application file for complete search history.

(56) References Cited

U.S. PATENT DOCUMENTS

| | | | | |
|---|---|---|---|---|
| 6,450,227 | B1 * | 9/2002 | Labardi | B65C 9/1865 271/111 |
| 10,700,623 | B2 | 6/2020 | Palmer et al. | |
| 2003/0218442 | A1 * | 11/2003 | Pigott | G05B 19/40 318/685 |
| 2004/0263098 | A1 | 12/2004 | Raupp | |
| 2006/0289106 | A1 | 12/2006 | Thiel et al. | |
| 2007/0040529 | A1 * | 2/2007 | Takebayashi | H02P 23/20 318/685 |
| 2008/0012522 | A1 * | 1/2008 | Wiegers | H02P 6/16 318/638 |
| 2008/0082206 | A1 * | 4/2008 | Egami | B65G 43/10 700/230 |
| 2010/0200159 | A1 * | 8/2010 | Le | B65C 1/021 156/362 |
| 2018/0109214 | A1 * | 4/2018 | Palmer | H02P 8/40 |

FOREIGN PATENT DOCUMENTS

| | | | |
|---|---|---|---|
| EP | 0092748 | A2 | 11/1983 |
| EP | 1494348 | A2 | 1/2005 |
| EP | 2666728 | B1 * | 12/2016 ............... B65C 9/02 |
| GB | 2581522 | A | 8/2020 |
| JP | 2003080750 | A | 3/2003 |
| JP | 2004208373 | A * | 7/2004 |
| WO | 2005037654 | A2 | 4/2005 |

OTHER PUBLICATIONS

International Search Report from PCT Application No. PCT/GB2021/051228, Sep. 24, 2021.
Partial International Search Report from PCT Application No. PCT/GB2021/051228, Aug. 3, 2021.
Chinese Office Action from Corresponding Chinese Patent Application No. CN202180035826.X, Dec. 31, 2024.

* cited by examiner

STEP-BASED SYSTEMS WITH MULTIPLE ACTUATORS

BACKGROUND

The present invention relates to the control of systems incorporating a set of actuators that need to be synchronised. A particular application would be a production line where various operations have to be performed on a unit that is conveyed through or assembled in the line. The actuators that perform these operations can be described as acting on quantised impulses, for instance stepper motors. Such motors, which typically operate in discrete steps (e.g. 200 steps, or "microsteps", per revolution) are in general easier to control than closed-loop servo motors and can be used to transport articles, such as labels and other substrates on a web during printing processes and the like. Another such system could be a heater that applies energy in quantised amounts.

The applicant's earlier application GB 1902455.3 (GB 2581522 A) explains how a quantised actuator such as a stepper motor can be controlled purely on the basis of a lookup table, without needing feedback. The present invention is a development of this work, expanding it to systems where a plurality of such motors can be controlled in synchrony without needing an elaborate overall control system.

Typically, stepper motors are used in applications where target positions have to be met, sometimes with coupled speeds at those positions, and these systems are used without feedback (using servomotors with feedback requires complex and expensive control). Associated microprocessors or similar control logic predetermines the timings used for each step of the movement to create a series of pre-determined positions and times for the individual steps of the movement profile. This requires the controlling logic to receive the motion targets and from these to generate a position/time sequence of steps before the motion begins. The time intervals between steps are either determined from a list of times or are calculated piecemeal. The calculation of the motion profile requires knowledge of the acceleration profile and is difficult to customize quickly for different applications, because reusing a motor in different applications requires "tuning" or optimisation to each application.

Stepper motors used in open-loop controls are considered quantized-torque devices. Provided that the load torque is less than the motor's torque output, then the motor will make a step. If the load is excessive, then the motor will lose synchronization with the controller and will typically stall. That is, the motor will be unable to position the load within the time expected for the motor's torque and the load's actual position will be unknown. In a moving system this typically causes a "stall" of the rotor which then stops moving in synchronisation with the driving magnetic force. Successful use of stepper motors in open-loop systems therefore requires appropriate selection of the acceleration profile and motor/load inertia to ensure reliable operation.

Present stepper motor systems generally use a series of motion equations to calculate the number and timing of the steps that a motor must make to position its load. Typically, a simple constant-acceleration or fixed-speed-increment model is used to change speed, as more complex control is not possible in the time available for the calculation to be performed. The determination of the acceleration is difficult, and although some systems exist which attempt to measure and then approximate a suitable value, the algorithm used by the positioning system fixes the type of acceleration that can be used. For example, a fixed constant acceleration algorithm cannot be used with a so-called "S-curve" acceleration model where the accelerations at start and end of the motion are different. In general, such systems are operated at a safe, below-optimum speed/position, typically leading to a minimum cycle time that is too long for much of the motion, and thus reduces throughput by comparison to an ideally calculated motion profile.

The earlier application GB 1902455.3 described how a stepper motor or similar actuator could be controlled by simply setting a series of waypoints for its motion, a waypoint being a position and speed for the motor, without regard to time, and listing the steps needed to achieve the waypoints by reference to a previously constructed lookup table, or "ramp table", of successive achievable positions and speeds.

SUMMARY

According to the invention in one aspect there is provided a control system for co-ordinating the movement of a set of actuators (5) each configured to operate in discrete steps to carry out movement in a machine, the control system, comprising: a controller (105) for each actuator, containing a table of values relating times taken to reach each successive step for each actuator during acceleration and deceleration, for loads within the capacity of the actuator; and a co-ordinator configured to determine or receive the position of each actuator and to receive or generate data concerning a waypoint, being positions and corresponding speeds for the actuators; wherein the controllers are further configured to raise (ACCN), lower (BRAKE) or maintain (COAST) the speeds of the actuators at each step by reference to the respective tables, by calculating the number of steps each actuator must travel to reach the waypoint and by raising, lowering or maintaining their respective speeds to ensure they are moving at the desired speed at the waypoint, and wherein also the co-ordinator starts the movement of at least one actuator (5c; 5d, 5e) on the basis of a point reached by another actuator (5a; 5b), so that both actuators reach the waypoint at the same time.

In a further aspect of the invention there is provided a control system for a system of quantised actuators, comprising: a set of controllers, one for each actuator, each controller including a memory for storing a table of values relating achievable speeds to positions for the actuator, where the positions are adjacent steps in the motor movement (e.g. rotation); and a central or distributed controller or co-ordinator configured to:
  determine a set of positions and speeds for two or more actuators that have to co-operate at a target waypoint, or for items moved by those actuators, and
  start movement sequences for at least one of the actuators at a point determined by counting steps back from the target waypoint.

Since each step corresponds to a position (linear or rotational) of the actuator, all the central controller has to do is to raise, lower or maintain the speed of the motor at each step by reference to the table, so that when the motor reaches the desired position it is moving/rotating at the desired speed.

Although usually each actuator or motor would have its own controller, such controllers could be shared, or they could be simply software components of a single overall processor.

The control system may further include a signal generator for sending a signal from one actuator controller to the controller of a downstream actuator to expect an item, and a diverter for removing the item from processing if the item does not arrive in accordance with the signal.

In general, the lookup tables are previously determined on an empirical basis, though they could be calculated from the motor specification and known load details. The tables are independent of the algorithms used by the controllers to control the motors, and for a different motor or load all that is needed is to store a different table in the control system. The system can thus run the motor in the shortest time between waypoints, without the algorithm knowing the specifics of the system.

The invention is also concerned with a method of controlling a set of stepper motors or similar quantised actuators, in which a table is provided for each actuator of successive achievable position values against speed values for the actuator, and the actuator is controlled to a target waypoint, being a desired position and speed for the motor, by calculating a series of steps by reference to the table; and a start motion for one actuator is set in dependence on the position reached by another actuator with which it has to co-ordinate.

In another aspect the invention is directed to methods of installing or replacing step-based actuators in a machine including one or more quantised actuators, each controlled by a controller by reference to a ramp table of achievable speeds against steps, wherein the characteristics of the new or exchanged motor are ascertained and the corresponding ramp table is installed in the controller.

More generally, systems envisaged by the invention advance in steps under a series of impulses ("quanta"), where the change brought about by each impulse at each step is ascertained in advance and stored in a table, either empirically or by calculation, and the system is controlled from waypoint to waypoint by a controller which combines the steps necessary to reach the next waypoint.

As with the earlier invention, a projection of the required speed and positioning movement is made into a co-ordinate system containing only positions (or steps) and a so-called "Ramp Table" of step-to-step times achievable by the given combination of motor and load for each actuator. The speed is then given by the inverse of the step-to-step time. The co-ordinate system of speed index and position is named "Step Space" and reflects the property of stepper motors that all speeds, accelerations and positions are quantized. Each point in Step Space is a position and speed achievable by the motor/load combination. Speed changes are ruled as being one index change per step only, and thus the difference in speed between adjacent speed indexes is the acceleration of the system over one step distance ($a=(v^2-u^2)/2$), and is fully and simply set by the times stored in the ramp table. It does not have to be constant and can represent any achievable speed change profile that is repeatable by the system. This is a very big advantage, since the same algorithm, without modification, is used with a wide variety of acceleration profiles.

The ramp table quantises both the achievable acceleration between speed steps and the maximum achievable system (motor) speed. In principle any acceleration that can be quantised either by measurement or calculation can be stored in the ramp table. In a traditional system the timing of braking and acceleration phases is determined by solving motion equations for the required trajectory. This typically involves multiplication, division and square root determinations which are time- and code-size-intensive to implement and solve. In contrast, systems using the invention need only perform a subtraction and comparison operation with a control output of only three values, namely increment, decrement or do nothing. This is very fast and simple to implement and can be performed using Boolean logic blocks—which could be instantiated in hardware (discrete logic). Although the use of discrete logic is not often used given the low cost of current microprocessors, in ultralow power systems—such as implantable electronics—this implementation could be advantageous.

This algorithm is fully independent of the actual step-to-step times stored in the ramp table, and therefore the actual acceleration profile in use. One algorithm is written to handle multiple load and motor profiles both at author time and, crucially, for future, unknown, combinations. That is, the algorithm can be written without knowledge of the mechanical load and achievable accelerations within the system; the only limitation is how much space is allocated for the table.

The ramp table contains a sampled version of an acceleration scheme which the motor and load can follow reliably. By creating suitable schemes for each motor/load combination, a single algorithm can control many different loads ideally. The table can represent accelerations which are non-linear and could be modified to reduce torque requirements around system resonances. A single equation defining the load acceleration is not required. For successful motor control the ramp table simply needs to contain values which the motor can work with reliably. In the simplest embodiment of the system the acceleration and deceleration values are identical; however, an extension is possible where a second table can define deceleration.

The invention in some embodiments removes the need to determine the entire profile before the motion starts and replaces this with a calculation for the next step only, made in the previous step, thus reducing the net cycle time and increasing throughput, without the need of a complex, fast microprocessor.

The algorithm is very simple to implement in low-cost systems but lends itself to controlling hardware-timed step-to-step times in each motor controller. The use of hardware timers to control step-to-step timing reduces jitter in timing compared to microprocessor-controlled times. This reduces energy that is smeared around the ideal acceleration curve and therefore allows more efficient and hence aggressive (i.e. faster) acceleration at lower stall risk.

The implementation of the control algorithm within a controller, power stage and AC/DC power supply configuration makes it possible to create a single "Intelligent Stepper Drive" (ISD) that can be added to a system to control a single motor with ideal motor control and low cost. Hardware triggers from one controller to another allow a complex motion task to be handled by several intelligent ISDs which each control a single axis. Such motions are typical of industrial printers, for instance. The movement of the web can be handled independently of the rendering process that generates the printed image and does not need to wait for it.

BRIEF DESCRIPTION OF THE DRAWINGS

For a better understanding of the invention, embodiments will now be described with reference to the attached drawings, in which.

DETAILED DESCRIPTION OF VARIOUS EMBODIMENTS

Figure 1A:
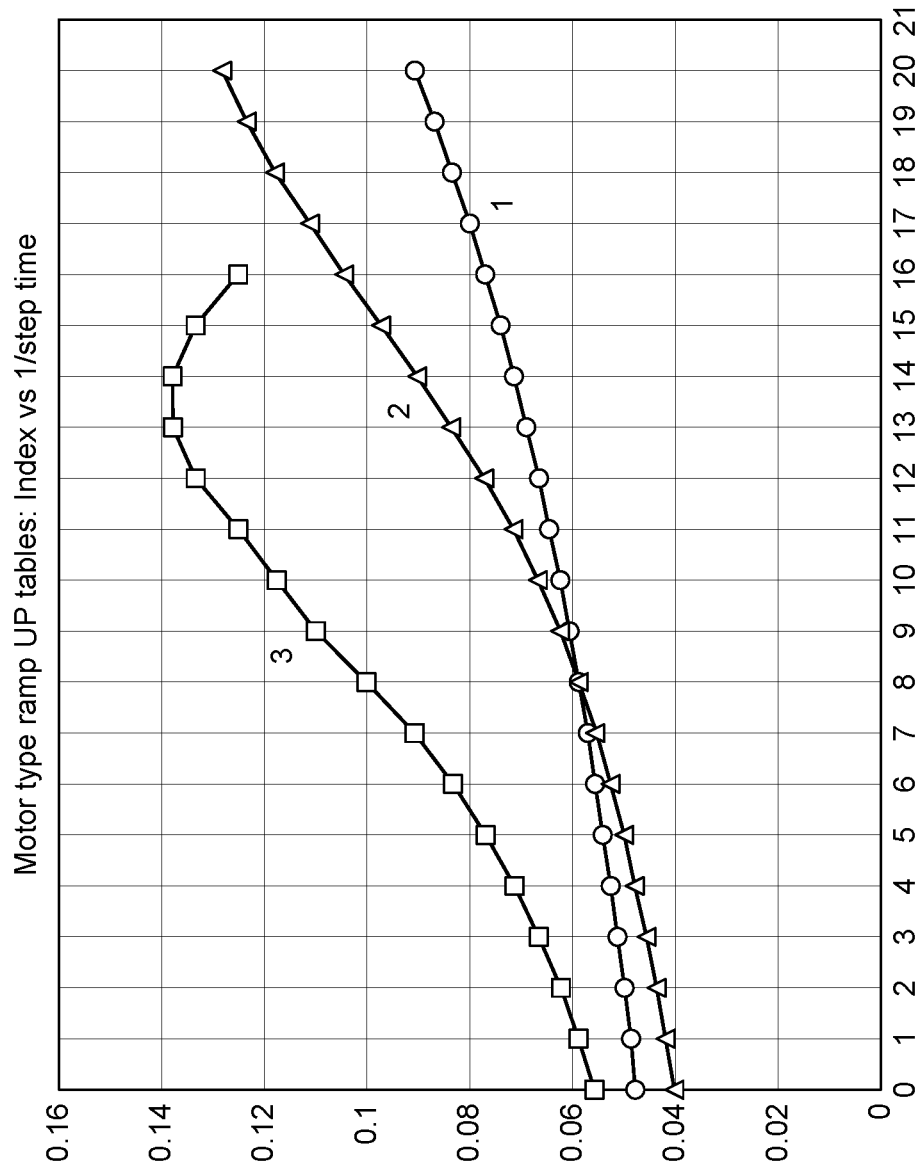
FIGS. 1a and 1b show ramp tables for typical stepper motors, for use with the invention.

Speed is defined as the index in a table of quantized speeds that are achievable by acceleration of the given motor/load combination. The difference between adjacent table entries represents the acceleration delivered by the motor between the speed intervals. This table is known as the "Ramp Table" and is a characteristic of the motor/load combination and so is predetermined as an application-specific setting.

The Ramp Table is a zero-indexed array of the times taken to complete a distance of one step, where the position (linear/rotational) of the motor is measured in steps. The steps are typically equidistant (e.g. the 1.8° rotation of a typical stepper motor), but need not be. As speed=distance/time, the ramp table values represent (1/speed). At higher speeds the difference in step times is small. In a real-life table there might be, say, 1024 entries and a maximum speed of 600 mm/s.

Provided that the ramp table is loaded with speeds between which the motor/load is capable of stepping (i.e. the acceleration between steps is within the torque capability of the motor), then the control of the motor's speed and position can be achieved by iterating up and down the index of the ramp table. By definition, if the index increases, the motor accelerates and the speed increases, and if the index decreases the motor decelerates and the speed decreases. If the index remains the same then the motor is defined to be coasting or stopped (no acceleration).

Because "Step Space" is simply a quantized version of the position, speed and hence acceleration of the motor/load combination, it can be used for the definition of the travel of any stepper-motor-based speed/position system, which is not stalled, or more generally any quantised system where a series of quantum changes describes the change from one physical state to another.

Because the distance to change speed is one step, then the minimum distance required to change between any two speeds defined by the table is the difference in the table index values. Provided that the index of the current speed is known, the distance to the next speed is also known. By summing the times stored in each index entry between the current point and the waypoint, the time to complete any movement made by transitioning speed values in the table, or coasting for a known number of steps, is also known.

The combination of the points above allows a simple Boolean logic system to determine a series of step times to control the acceleration of the motor from any speed to another speed along an achievable speed profile based only on the current speed index, the target speed index and the distance from the current position to the demand position. If the motion is not possible, an error can be generated, or a speed or position priority can be adopted to replace the target with an achievable one.

Achieving position and time simultaneously is a significant challenge in traditional control systems such that it is common to use supervisory controllers to calculate accelerations to predict time and position. Also closed-loop feedback and position correction may be required throughout the motion cycle. Such systems generally require servomotors and can be complex and expensive. If stepper motors are used, they do have to make open loop recalculations as to when a motion might need to start, or a synchronised other external event might need to be signalled in time to allow it to mesh with the first.

Stepper motors together with a simple control system can be an efficient (low cost) element in applications where target positions and target speeds have to be satisfied. Used in open-loop configuration, stepper motors can be considered as quantized-torque devices. Provided the torque requirements of the motion are within the torque capability of the motor drive system the motor will make the intended step (satisfying the target speed and position, within the tolerable errors).

Figure 1B:
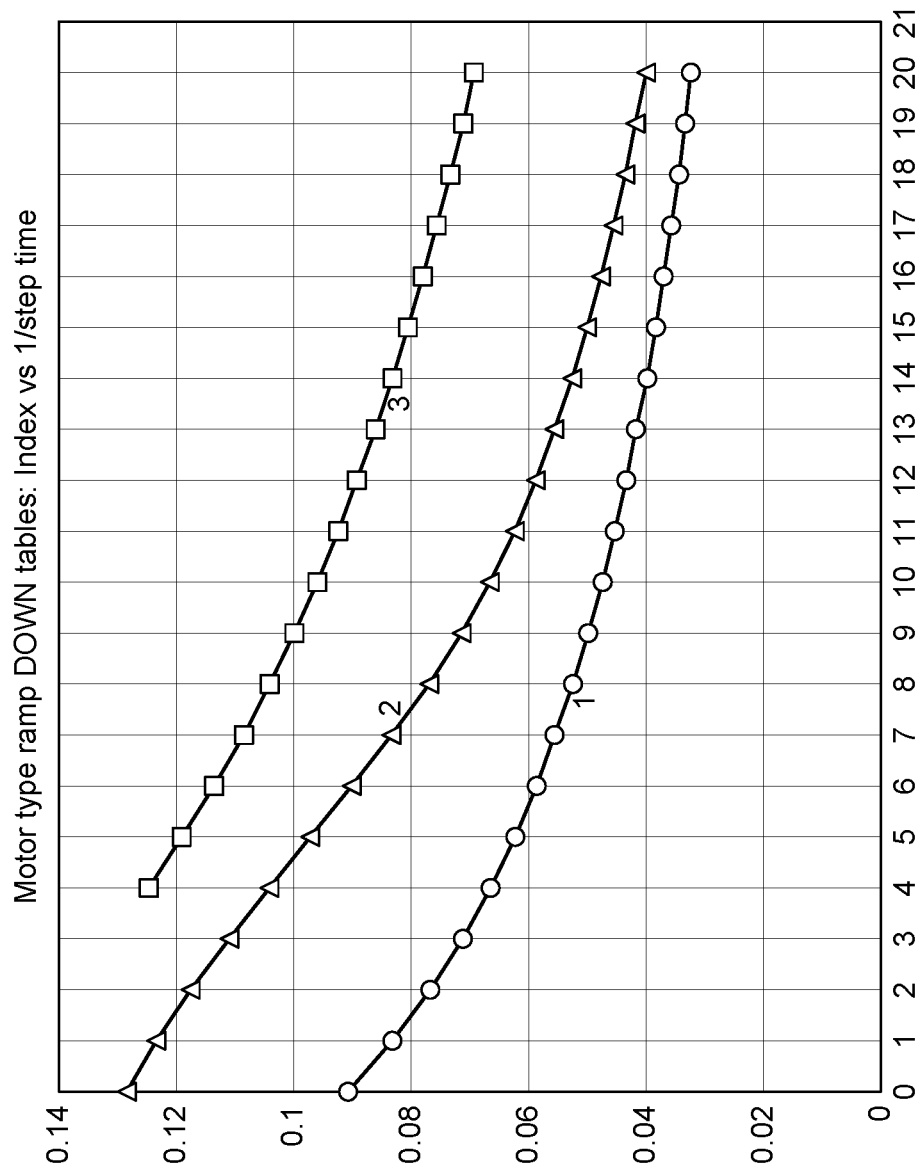

FIGS. 1a and 1b show the ramp, acceleration (UP) and deceleration (DOWN) of a set of three stepper motor types; these might be motors from different manufacturers, for example. Positions on the x-axis are equally spaced physical steps (rotational or linear) and step time is the time between each step. The motors are selected to have sufficient torque for the expected conditions within the application. That is to say that the ramps in FIGS. 1a and 1b are the same for the motor unloaded as they are for the motor plus the application load. The different ramp tables represent the safe operation of each motor type. Note that the total time to move through all points defined is different for each motor type, but the distance covered is the same (i.e. there are the same number of quantised step intervals plotted).

As can be seen, in the UP table, for motors 1 and 2 the speed increment, represented by the reciprocal of step time, rises monotonically up to step 20. Motor 1 starts at a slightly lower speed but—purely by way of example—rises faster and crosses over the curve for motor 2 at step 8. Motor 3, on the other hand, starts at a still higher speed increment, but reaches peak acceleration at steps 13 and 14, after which the speed increment decreases again.

In the DOWN table (FIG. 1b), all three curves decrease monotonically and do not cross. Again, the three curves are merely typical examples and do not limit the invention. It will be appreciated that the central controller or co-ordinator needs to take into account only the step tables and does not need to calculate any motion equations.

The motor can also be used as a brake. The braking profile is shown returning the index towards zero. For a motor type ramp up and ramp down profiles are unlikely to be the same in practice.

The values in the ramp tables for the different motors are given in Tables 1a and 1b below.

TABLE 1a

| Motor Ramp UP Table | | | | | | | |
|---|---|---|---|---|---|---|---|
| | Time before next step | | | | 1/Time before next step | | |
| Index | Motor 1 | Motor 2 | Motor 3 | Index | Motor 1 | Motor 2 | Motor 3 |
| 20 | 7.8 | 11 | | 20 | 0.128205 | 0.090909 | |
| 19 | 8.1 | 11.5 | | 19 | 0.123457 | 0.086957 | |
| 18 | 8.5 | 12 | | 18 | 0.117647 | 0.083333 | |
| 17 | 9 | 12.5 | | 17 | 0.111111 | 0.08 | |
| 16 | 9.6 | 13 | 8 | 16 | 0.104167 | 0.076923 | 0.125 |

TABLE 1a-continued

Motor Ramp UP Table

| | Time before next step | | | | 1/Time before next step | | |
|---|---|---|---|---|---|---|---|
| Index | Motor 1 | Motor 2 | Motor 3 | Index | Motor 1 | Motor 2 | Motor 3 |
| 15 | 10.3 | 13.5 | 7.5 | 15 | 0.097087 | 0.074074 | 0.133333 |
| 14 | 11.1 | 14 | 7.25 | 14 | 0.09009 | 0.071429 | 0.137931 |
| 13 | 12 | 14.5 | 7.25 | 13 | 0.083333 | 0.068966 | 0.137931 |
| 12 | 13 | 15 | 7.5 | 12 | 0.076923 | 0.066667 | 0.133333 |
| 11 | 14 | 15.5 | 8 | 11 | 0.071429 | 0.064516 | 0.125 |
| 10 | 15 | 16 | 8.5 | 10 | 0.066667 | 0.0625 | 0.117647 |
| 9 | 16 | 16.5 | 9.1 | 9 | 0.0625 | 0.060606 | 0.10989 |
| 8 | 17 | 17 | 10 | 8 | 0.058824 | 0.058824 | 0.1 |
| 7 | 18 | 17.5 | 11 | 7 | 0.055556 | 0.057143 | 0.090909 |
| 6 | 19 | 18 | 12 | 6 | 0.052632 | 0.055556 | 0.083333 |
| 5 | 20 | 18.5 | 13 | 5 | 0.05 | 0.054054 | 0.076923 |
| 4 | 21 | 19 | 14 | 4 | 0.047619 | 0.052632 | 0.071429 |
| 3 | 22 | 19.5 | 15 | 3 | 0.045455 | 0.051282 | 0.066667 |
| 2 | 23 | 20 | 16 | 2 | 0.043478 | 0.05 | 0.0625 |
| 1 | 24 | 20.5 | 17 | 1 | 0.041667 | 0.04878 | 0.058824 |
| 0 | 25 | 21 | 18 | 0 | 0.04 | 0.047619 | 0.055556 |

TABLE 1b

Motor Ramp DOWN Table

| | Time before next step | | | | 1/Time before next step | | |
|---|---|---|---|---|---|---|---|
| Index | Motor 1 | Motor 2 | Motor 3 | Index | Motor 1 | Motor 2 | Motor 3 |
| 0 | 7.8 | 11 | | 0 | 0.128205 | 0.090909 | |
| 1 | 8.1 | 12 | | 1 | 0.123457 | 0.083333 | |
| 2 | 8.5 | 13 | | 2 | 0.117647 | 0.076923 | |
| 3 | 9 | 14 | | 3 | 0.111111 | 0.071429 | |
| 4 | 9.6 | 15 | 8 | 4 | 0.104167 | 0.066667 | 0.125 |
| 5 | 10.3 | 16 | 8.4 | 5 | 0.097087 | 0.0625 | 0.119048 |
| 6 | 11.1 | 17 | 8.8 | 6 | 0.09009 | 0.058824 | 0.113636 |
| 7 | 12 | 18 | 9.2 | 7 | 0.083333 | 0.055556 | 0.108696 |
| 8 | 13 | 19 | 9.6 | 8 | 0.076923 | 0.052632 | 0.104167 |
| 9 | 14 | 20 | 10 | 9 | 0.071429 | 0.05 | 0.1 |
| 10 | 15 | 21 | 10.4 | 10 | 0.066667 | 0.047619 | 0.096154 |
| 11 | 16 | 22 | 10.8 | 11 | 0.0625 | 0.045455 | 0.092593 |
| 12 | 17 | 23 | 11.2 | 12 | 0.058824 | 0.043478 | 0.086207 |
| 13 | 18 | 24 | 11.6 | 13 | 0.055556 | 0.041667 | 0.086207 |
| 14 | 19 | 25 | 12 | 14 | 0.052632 | 0.04 | 0.083333 |
| 15 | 20 | 26 | 12.4 | 15 | 0.05 | 0.038462 | 0.080645 |
| 16 | 21 | 27 | 12.8 | 16 | 0.047619 | 0.037037 | 0.078125 |
| 17 | 22 | 28 | 13.2 | 17 | 0.045455 | 0.035714 | 0.075758 |
| 18 | 23 | 29 | 13.6 | 18 | 0.043478 | 0.034483 | 0.073529 |
| 19 | 24 | 30 | 14 | 19 | 0.041667 | 0.033333 | 0.071429 |
| 20 | 25 | 31 | 14.4 | 20 | 0.04 | 0.032258 | 0.069444 |

It is a feature of embodiments of the invention that the system overcomes the problems of uncertainty in position and time. The chosen stepper motor always has an excess of torque such that the next step is always achieved. The (ramp) table of achievable position change vs. time for the motor is chosen so that the motor always has an excess of torque to guarantee that the next position and time movement can be made successfully. This maintains system performance without the need for calibration or closed-loop feedback and is an aid to the overall reliability and serviceability of the system.

Performance is not at risk as a consequence of changing load amplitude (as long as there is an excess of torque) for example as a consequence of the operation (load) being performed, wear or start-up friction. Also, performance is not at risk as a consequence of changing load timing (again, as long as there is an excess of torque).

It can be seen that the invention supports the interchange of motor types (FIGS. 1a and 1b). The ability to change the motor or motor type increases serviceability and simplifies maintenance of the machine design, e.g. in the case of motor obsolescence.

Figure 2:
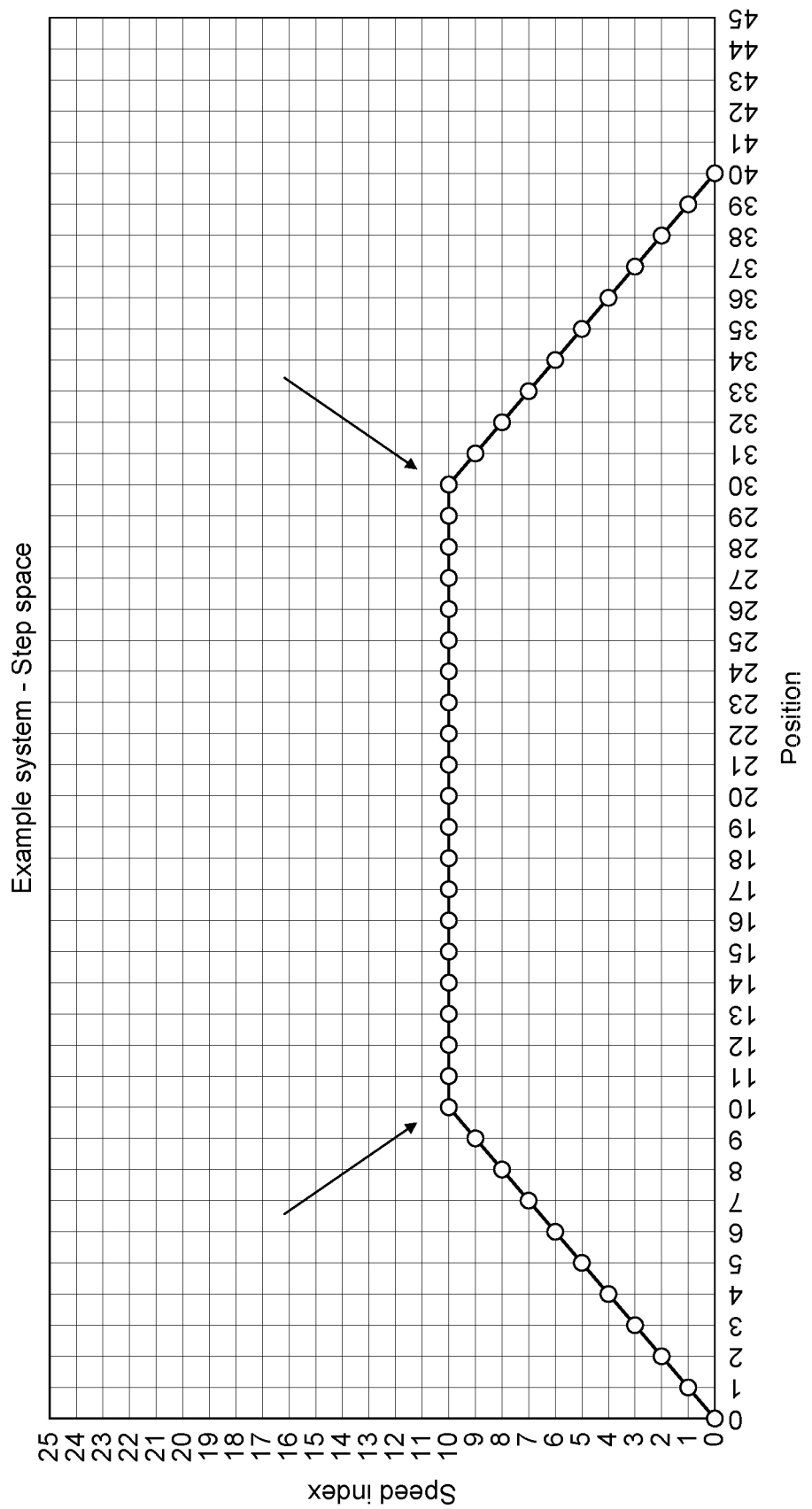
FIG. 2 is a graph of the step-space model of a possible travel of a stepper motor.

FIG. 2 represents an example of motor travel in which it is desirable to have acceleration to a constant, given, speed, which then takes place between positions 10 and 30, followed by deceleration to zero. Waypoints (shown by the arrows at the corners) are defined at these positions and an algorithm generates the co-ordinates through which the system passes to in order to reach the waypoints and, in the case of the example, the speed between those waypoints.

The system is firstly re-imagined as being a quantised space and time system. A series of targets is identified as coordinates of position and speed, which must lie on the ramp table for the motor that is to be used. This table must have previously been determined, e.g. empirically. Each entry in the table differs in position by a single quantisation interval (distance) of the system and defines the time to make an additional movement of one distance interval from the last position. This change of position over time represents the quantised speed of the motor at this point.

The index of the table along with the time entry stored therein is referred to as "Step Space" in this description.

The target positions which exist in step space are defined as a series of waypoints. The system must travel from the start position through each waypoint in sequence. Each waypoint defines a required speed (table index) and position co-ordinate in step space.

In addition, a maximum allowable table index or single value may be declared which defines the maximum speed that the system is allowed to use whilst travelling between waypoints (for motor 3 the index is restricted to 16).

Initially, at rest, the index of the table (see table 1a) is defined as 0 and the time stored there will be the time before the next movement or step completes.

The example below is for a simplified system where the acceleration and deceleration ramp tables are identical. This means the distance to stop from a speed is the same as the distance to reach that speed.

As the motion is triggered the algorithm makes the following determinations:

1. Calculate the difference between the current table index and the waypoint demand table index. This is the speed offset.
2. Calculate the difference between the current position of the system and the required waypoint target position. This is the position offset.
3a. If the speed offset>the position offset, it is impossible to meet the waypoint. Error handlers can determine if a "best achievable" motion is made which will perhaps meet the speed but further away, or an error is flagged to abort a process.
3b. If the position offset>the speed offset, then it is possible to meet the waypoint and processing continues.
4. If the motion is possible then a decision is made as to how to change the current speed (table index) of the motor, as follows:
   a) If the current table index<the maximum allowable table index then, if the speed offset+2<the position offset then increase the speed index by 1, i.e. accelerate.
   b) If the speed offset+1=the position offset then do not change the speed.
   c) If the speed offset=the position offset then decrease the speed by 1.

Table 2 below shows the resulting list of instructions or values. It comprises six columns, namely position (step); speed (i.e. speed index); speed error (i.e. difference from the desired speed at the waypoint, in this case 5); position error (number of steps from the waypoint); mode, i.e. accelerate, "coast" or decelerate; and the corresponding program command. In this example a maximum speed of 10 is set, so the controller directs the motor to operate at the maximum speed for as long as possible before decelerating again to the target speed of zero. It will be appreciated that there are only three different commands, which represents a very simple control system.

TABLE 2

| Position | Speed | Speed Error | Pos Error | Mode | Prog |
|---|---|---|---|---|---|
| 0 | 0 | −5 | 42 | COAST | C |
| 1 | 1 | −4 | 41 | ACCN | A |
| 2 | 2 | −3 | 40 | ACCN | A |
| 3 | 3 | −2 | 39 | ACCN | A |
| 4 | 4 | −1 | 38 | ACCN | A |
| 5 | 5 | 0 | 37 | ACCN | A |
| 6 | 6 | 1 | 36 | ACCN | A |
| 7 | 7 | 2 | 35 | ACCN | A |
| 8 | 8 | 3 | 34 | ACCN | A |
| 9 | 9 | 4 | 33 | ACCN | A |
| 10 | 10 | 5 | 32 | ACCN | A |
| 11 | 10 | 6 | 31 | COAST | C |
| 12 | 10 | 7 | 30 | COAST | C |
| 13 | 10 | 8 | 29 | COAST | C |
| 14 | 10 | 9 | 28 | COAST | C |
| 15 | 10 | 10 | 27 | COAST | C |
| 16 | 10 | 11 | 26 | COAST | C |
| 17 | 10 | 12 | 25 | COAST | C |
| 18 | 10 | 13 | 24 | COAST | C |
| 19 | 10 | 14 | 23 | COAST | C |
| 20 | 10 | 15 | 22 | COAST | C |
| 21 | 10 | 16 | 21 | COAST | C |
| 22 | 10 | 17 | 20 | COAST | C |
| 23 | 10 | 18 | 19 | COAST | C |
| 24 | 10 | 18 | 18 | COAST | C |
| 25 | 10 | 17 | 17 | COAST | C |
| 26 | 10 | 16 | 16 | COAST | C |
| 27 | 10 | 15 | 15 | COAST | C |
| 28 | 10 | 14 | 14 | COAST | C |
| 29 | 10 | 13 | 13 | COAST | C |
| 30 | 10 | 12 | 12 | COAST | C |
| 31 | 9 | 11 | 11 | BRAKE | B |
| 32 | 8 | 10 | 10 | BRAKE | B |
| 33 | 7 | 9 | 9 | BRAKE | B |
| 34 | 6 | 8 | 8 | BRAKE | B |
| 35 | 5 | 7 | 7 | BRAKE | B |
| 36 | 4 | 6 | 6 | BRAKE | B |
| 37 | 3 | 5 | 5 | BRAKE | B |
| 38 | 2 | 4 | 4 | BRAKE | B |
| 39 | 1 | 3 | 3 | BRAKE | B |
| 40 | 0 | 2 | 2 | BRAKE | B |
| 41 | −1 | 1 | 1 | BRAKE | B |
| 42 | −2 | 5 | 0 | BRAKE | B |

If a motor needs to be replaced, then other motors, such as those described in relation to FIG. 1, can easily be substituted. The algorithm would simply generate new LUT (step space) entries from the motor ramp table for the new motor. The algorithm, and the controller as such, would remain unchanged. The decisions that the algorithm makes are unaffected. The ramp table defines what the motor must be asked to do to safely make a movement, and the controller just asks the motor to change its speed, or not, as it moves towards a waypoint. An alternative motor may require more steps to make the motion, but it cannot require fewer steps because each step is a quantised position change that the motor can take, and the waypoint is defined in a series of those steps. The ramp table is a property of the motor, not the algorithm. Two alternative motors with different ramp tables may take different times to make the movement but they will cover the same distance in total. The algorithm acts to move the motor and load through step space to the waypoint(s).

It should be noted that the system driven according to the new ramp table entries will continue to satisfy the target performance between positions 10 and 30, since the motor has been selected to have an excess of torque. However, if for example the motor acceleration is less than the previous motor (see FIG. 1a) then the time to achieve the desired start position is increased, i.e. the system, based on step space, will initiate the motion earlier.

"Step space" means, considering all actions as lying on the line drawn in the ramp table—anywhere off this line is impossible for the quantised system to achieve. Time is not considered as the fundamental design driver for the motion. Step space considers where a motion goes, not when it gets there. The time may be found out by summing the individual times contained within the table for each index. If a motion needs to complete at a given time, then the algorithm can be prototyped (i.e. run in a simple simulation of the movement) where each decision step is made within a computer program and each associated time summed to give an aggregate time for the motion itself. Because the algorithm is a simple add/subtract and compare process, and the times in the table can be added easily, the execution time of the prototype is fast. This enables a "start time" to be calculated rapidly if required.

Figure 3:
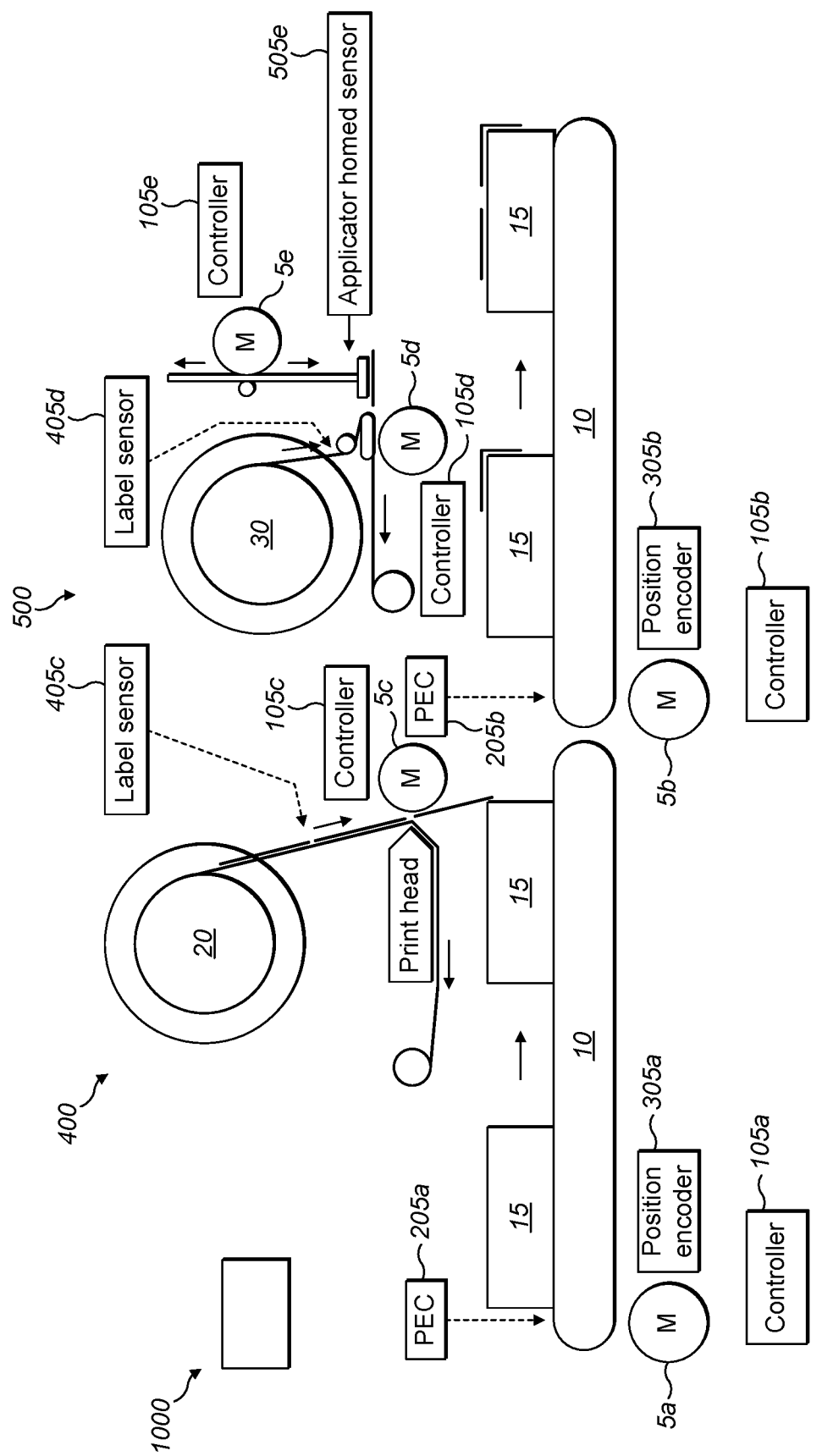
FIG. 3 is a diagram of a typical application of the invention in printing and applying labels to packaged food items.

FIG. 3 shows an example of an application of the invention where several actuators are to be controlled and synchronised. The drawing schematically shows a production line for applying labels to packs 15 arriving from a food processing plant. The packs 15 are each weighed at a weigh station (not shown), and the weight supplied to a central or distributed processor or co-ordinator 1000. The packs 15 travel along a conveyor system with successive belts 10—first and second conveyors 10a, 10b—run by stepper motors 5a, 5b. These motors each have their own controller 105a, 105b, including a ramp table corresponding to the motors, as discussed previously. Each conveyor has associated with it a labelling and/or printing station 400, 500, the challenge being to apply (and, in the case of the first station 400, print) the appropriate label to the pack as it passes.

A typical system uses two sensors to allow tracking of an object as it enters the ISD (Intelligent Stepper Design) waypoint system and may also use additional homing sensors depending on the function of the application.

The first sensor 205a is usually a photoelectric beam sensor ("PEC") which changes state when the beam is blocked—for example by a pack as it arrives from, typically, a weighing station (not shown). This arrival sets the zero for the synchronisation process. The second sensor 305a is usually a positional encoder that tracks the movement of the conveyor carrying the object towards the other controllers within the motor system. Hardware within each controller is able to sample the photocell each time the conveyor encoder makes a positional change, also known as a tick, i.e. one step of the motor 5a. In this way a copy of the photocell, measured in the positional resolution of the conveyor encoder, is passed to the trigger point of the controller action. An important element of this arrangement is that the position of the object is tracked, and the speed of the conveyor is not important. (This arrangement can be thought of as a virtual photocell which is delayed to the trigger point by the shifting action of the copy of the PEC that is made by the encoder, and so the ISD is triggered by this virtual photocell to operate "immediately". If the virtual PEC is replaced by another system that can do the same thing, then the ISD can be triggered by that instead).

The encoder may be incorporated into the function of the motor controller through synthesis. Sensors are located to detect pack positions; for example, a photocell positioned across a conveyor would be used to detect the front or rear edge of a pack.

Pulses from the encoder 305a register steps used to monitor the position of the conveyor. It has to be taken into account that the conveyor speed might not be constant. For example, the addition of a pack from a previous conveyor can cause a deceleration followed by a correcting acceleration to regain an average speed. It will be apparent that the speed and hence time for a pack to achieve a specific position will not be constant or predictable with the mass and arrival time of new loads being unknown.

A common interconnect system or co-ordinator used between the ISD units shares common tracking signals of the encoder and PEC, plus additional machine-wide control such as emergency stop and safe-to-run interlocks. Homing signals such as label length and applicator position sensors may be plugged directly into a local controller in cases where that information is used uniquely by that controller. Within the design one input may be used to share with later units in the control chain via the common interconnection system, and all I/O may be remotely shared via a CAN (controller area network) bus.

The system is shown with packs 15 running left to right. The first motor 5a drives the first conveyor 10a feeding packs along the conveyor towards the first printing station 400. The motor controller 105a for the conveyor motor 5a drives the conveyor at a specified average speed. The photocell 205a identifies the front edge of each pack and sends a signal to the controller 105a, which counts pulses from the encoder 305a to monitor each pack's position. Both the conveyor encoder 305a and PEC 205a signals are passed to and between further controllers using the common interconnect system.

Each pack 15 is passed to the next conveyor 10b, which is driven by its own motor 5b and in this embodiment is controlled by a second controller 105b. Pack integrity (traceability) is an important feature; hence the first controller 105a provides an output signal to the next controller 105b with an "expect an arrival" signal. The second Controller 105b compares the photocell signal 205b with the confirmation signal from the first controller 105a, and, if these match, the pack 15 is accepted into the next conveyor system 10b. If a PEC 205b indicates to the conveyor controller 105b the arrival of a pack without confirmation from the previous controller 105a, then the pack fails its security test, and the PEC signal is masked from reception by further controllers downstream.

At the start of the second conveyor 10b is a second photocell 205b; the corresponding controller 105b compares the actual arrival with the expected arrival as a means of validating the pack identity. The pack security is used to verify that the pack has not been tampered with, removed or replaced in a way which would move it on the conveyor by more than an accepted limit—usually a few mm of equivalent distance ticks.

Meanwhile, or before this point, a third controller 105c tracks the progress of each pack towards the preconfigured position where a label should be fed forward to meet the pack, driven by a third motor 5c, which drives the web of a reel of labels in the printing/labelling station 400. The controller is also pre-configured with a series of waypoints relating to when on each label that printing should be applied, with respect to the edge of the label, as previously detected and measured by the controller 105c using a label edge sensor 405c. In the system governed by the controller 105c the requirement is that the label meet the pack 15 at the same speed that the pack is moving. The target speed for the controller 105c is therefore determined by measuring the speed of the conveyor 10a through the "ticks" from the encoder 305a. When the pack reaches a point which is the same number of ticks from the apply point and the length that the label must travel to meet the pack, the controller 105c begins the movement of the motor 5c which drives the label. The controller targets the label speed to meet the conveyor speed at the intercept point of the label and pack. However, until that point the speed is controlled only to meet that intercept, while not exceeding the printing speed as long as the label is in a print space. While the label position matches the previously configured print zone, the controller 105c also issues a request to the associated print head to trigger printing, which in turn imprints the label. The label is then separated from the backing web and applied to the leading edge of the package as shown. At the end of the print cycle the controller 105c rewinds the label web to return the label to the start position for the next cycle and then returns to a waiting mode for the next pack to be handled.

Labelled packs travel on to the next conveyor system 10b, driven by motor 5b and controlled by its controller 105b. In the same way as the previous conveyor and printer system, the PEC 205b and encoder 305b are connected to the web motor controller 105d which uses a label sensor 405d to detect and position a label ready to be fed forward to an applicator 30, with its associated "Applicator homed" sensor 505e. This system applies pre-printed special labels such as "special offer" and does not require a printer. The labels are applied on the upper surface towards the back of each pack 15, and so the applicator 30 driven by its motor 5e is used to receive the label from the reel as driven by its motor 5d, and then to place this onto the pack 15.

The controller 105e also receives signals from the encoder 305b and PEC 205b through the common interconnection system. Controller 105e is previously configured to move the applicator from the collection point to the apply point, and then to return to a position just above the "Applicator homed" sensor 505e. As the sensor 505e is passed, the motor controller performs a capture of the current speed and then a decelerate-to-stop process. The current speed as it passes the sensor allows the controller then to calculate the distance back to the homing sensor and to start a target motion to return to that point ready for a new label to be received. The apply action is triggered when the required travel of the applicator from the collection point to the application point is the same as the distance that the part of the pack to be labelled has to travel to the application point, as measured by the encoder 305b.

The controllers 105c, 105d and 105e may communicate with their local conveyor controller (either 105a or 105b) to indicate whether their respective motion profiles were successfully completed or not. A case of a failed process might be caused by missing labels preventing a system being able to home correctly before the next pack should be labelled. This information can be used by the relevant conveyor controller 105a or 105b to cancel the "expect an arrival" signal to the next conveyor and therefore automatically prevent further processing of packs, or to stop the machine, or indeed to allow a reject system (not shown) to remove the pack from the system.

Figure 4:
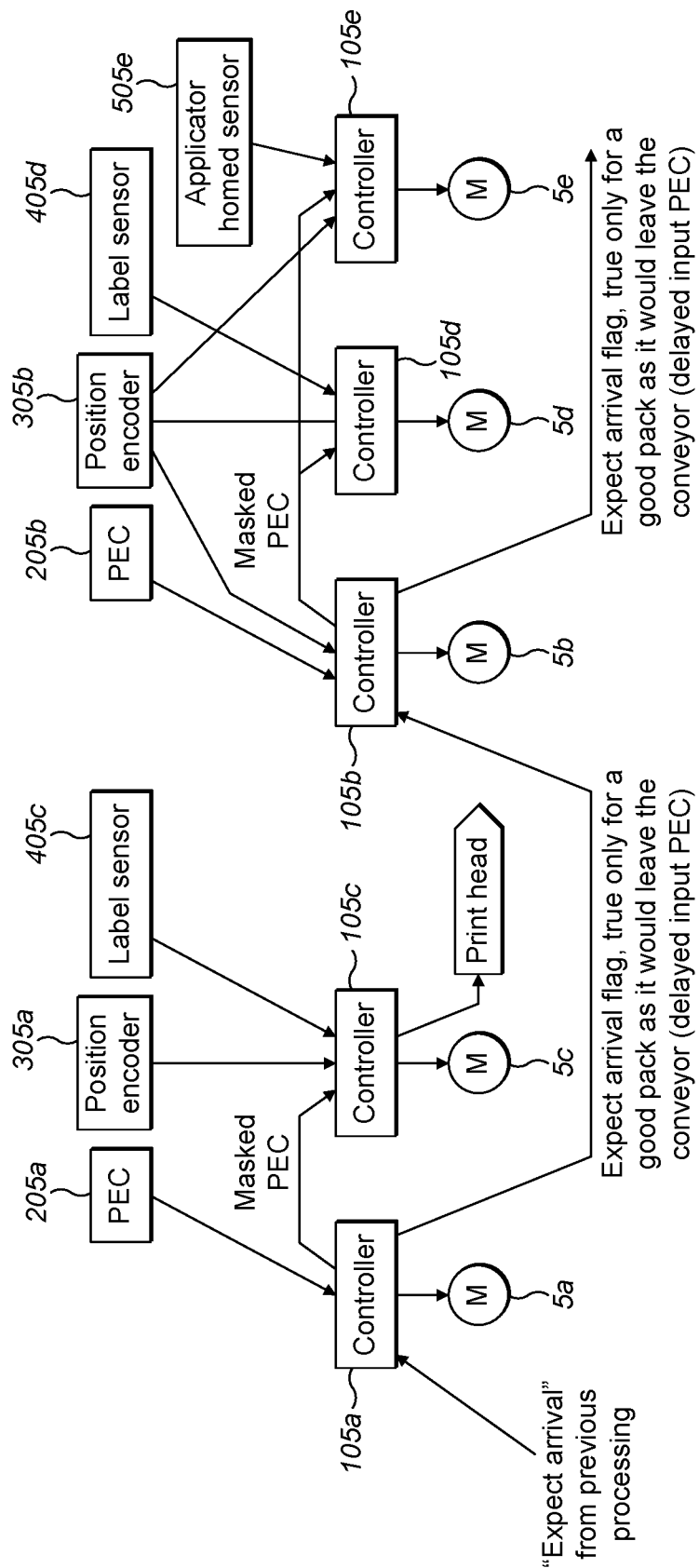
FIG. 4 is a diagram showing the communication between the various controllers.

The communication between the various controllers 105 (five of them, in this embodiment) is shown schematically in FIG. 4. It will be seen, for instance, that the controller 105c for the printing/labelling operation receives a masked, or delayed, signal from the PEC 205a, which leads to operation of the print head and the web travel at the right time to meet the food package. Similar considerations apply to the controllers 105d, 105e associated with the second conveyor 10b.

This operation does not need monitoring of the position of the items, because the stepper motors move in known steps. The only requirement is to count the number of steps. It does not even matter whether the stepper motors operate in the same intervals (e.g. 200 steps per revolution), because this is taken into account in the ramp tables.

Although the controllers 105 in this embodiment are shown as separate components, they need not be physically separate, but can be separately embodied in software, for instance.

Clearly the invention is not restricted to printing applications, or to food packaging, but can be used for any process where two or more operations have to be synchronised, which can be done by counting back steps from the point where the synchronisation has to take place and starting the respective operations accordingly.

In summary, because the stepper motor's speed can be described by a list of speeds, and because the change of speed must be one distance interval, then the difference between position indexes corresponding to those speeds in the table is the distance the motor must travel to make this speed change, the distance travelled in order to arrive at any given speed can be simply calculated by subtraction—and similarly the speed that can be achieved in a known distance is just the offset in the table. This calculation requires minimal processing capability and can be performed on a step-by-step basis by a dedicated processor. It also allows a motion to be adapted after it starts, in order to meet a new target, which is a unique advantage for minimising the uncertainty in the contact point between label and target if the position of the conveyor/target is continually tracked and updated by the motor controllers. That position can be obtained by monitoring the conveyor motor Hall sensors, and this ability is integrated into the ISD (Intelligent Stepper Drive).

Example

Use of Intelligent Stepper Drive with a thermal transfer printer.

A thermal transfer printer system is comprised of an applicator system plus a label drive system and a ribbon drive system. In one example of this machine the control is required to:
1) start the web and ribbon drives synchronously so that the movements of the ribbon and web occur together, with minimal instantaneous speed differences between the ribbon and web;
2) apply a series of control signals to a thermal printhead such that at the relevant image positions required to be printed on to the label, the ribbon is heated with a pattern of "dots" representing a line of the image;
3) The ink held on the ribbon melts underneath the heated dots and begins to transfer to the label medium and the control system moves both ribbon and web away from the print head by one line, maintaining the relative position of the ribbon and label while the ink transfers and dries;
4) The process repeats for the image to be printed;
5) Once the image is completed the control system moves the ribbon and label to the collect position to allow the applicator to receive the label;
6) The applicator takes the label and applies it to the pack which is required to be labelled with the printed information;

Any difference in speed and relative position of ribbon and web whilst the ink is in the melted state (during transfer) causes distortion to the printed image and reduces readability.

One advantageous improvement to this system is to reduce the amount of ribbon that is moved during the web movement process so that only that ribbon that carries printed ink is moved—and any ribbon that does not need to be used for printing is not moved.

The ISD allows this machine to be simply split into a series of separate control events that must synchronise at certain points.

The web controller is programmed to receive waypoints that describe the start and finish of each section of print that is required, and the end of the label. In addition, the web controller is programmed to produce an output strobe (hardware signal) that occurs at the end of every step made between the start and end of each print area described by waypoints. This signal triggers a printing system to print a line of the image each time a strobe is received.

The ribbon controller is programmed to make a similar movement to the web. However, the waypoints for the print areas are changed so that the ribbon achieves the print speeds slightly before the print zones start and maintains the speed for a small distance afterwards. These zones are used to allow the mechanical systems to settle and for ink to finish a transfer—these distances are programmable in steps. One key other difference is that the ribbon system is set a zero-speed target between each print zone which causes the controller to attempt to stop the ribbon between print zones and reduce waste to that necessary distance required to accelerate and decelerate the ribbon between print zones. The controller algorithm has a speed priority for the printing process such that if it is not possible to stop the ribbon between printing it slows to the minimum speed that is consistent with meeting its waypoints. Both controllers are triggered by the same external trigger—which is a photo sensor that detects the object to be labelled.

A second implementation of this can be made by programming the ribbon system to accelerate to the print speed when triggered by an external trigger and then maintain the speed until the triggers stop whereupon the motor is then controlled to stop the ribbon. In this implementation the print signal from the web controller can be used to automatically start the ribbon when needed. To complete this system the web must "print whitespace"—which is a series of lines of print that have no actual image, but which are the space required by the ribbon to accelerate to the print speed, and to hold the speed while the last line of print transfers. This system can be easier to implement as it is simple to modify the print speeds and determine the change in synchronisation distances.

It can be seen that the invention allows the change of machine type to be achieved by adding a new controller and its setup data—where the controller and its software is the same as the other motor controllers using this invention to the point that they are interchangeable The invention has been described by reference to examples from the field of printing but, as indicated above, it is relevant to the control of stepper motors generally, and to servomotors when operating in a positioning mode. Moreover, this principle applies to all quantized intervals and can be extended to quantized time systems. For instance, a system in accordance with the invention can be used for temperature control where a heater delivers a certain amount of energy in each "step", and for a given load the temperature rise is known. This means that thermostatic control may not be needed. An application might be in the control of heaters for inkjet print nozzles. It can also be used to predict the temperature of a system which suffers heating due to the repeated application of energy at each step, through the principal of Newtonian cooling and the variable duty cycle controlled by this system, where such a system has a predominantly constant rate of cooling.

The invention is applicable to a range of machines used in the processing, packaging and logistics of food stuff. Actuators, sensors and controllers are heavily used in simple transport systems, such as conveyors. Equally those systems that act to converge or diverge product as it is routed in the production environment. More advanced systems, according to the invention, utilise multiple actuators and sensors in the form of machine modules that perform a broad range of functions; slicing, portioning, inspecting, weighing, label application, label printing, packing and any similar task requiring the control of motion. The motion may be multi-axis in nature with actuators provided to enable motion in each axis required. The wrapping of labels of the folding of sleeves around one or more sides of a pack, for example. Complex systems or production cells can comprise a number of machine modules and could facilitate a combination or duplications of many functions.

Aspects of the invention may further be considered in the following clauses:

Clause 1. A control system for a set of actuators (5) that operate in discrete steps to carry out movement in a machine and are required to synchronise at points in speed and position, comprising:

a controller (105) for each actuator, containing a table of values relating achievable speeds to positions for each actuator, where the positions are adjacent steps in the motor movement; and a co-ordinator configured to determine or receive the position of the actuators and to receive or generate data concerning a waypoint, being positions and corresponding speeds for the actuators;

wherein the controllers are further configured to raise, lower or maintain the speed of the actuators at each step by reference to the tables, in such a way that when the actuators reach the desired positions they are moving at the desired speed, and wherein also the co-ordinator starts the movement of at least one actuator (5c; 5d, 5e) on the basis of a point reached by another actuator (5a; 5b), so as to achieve the desired synchronisation.

Clause 2. A control system according to clause 1, further comprising at least one sensor (305a; 305b) for ascertaining the position of the said other actuator (5a; 5b), or of an item moved by it, the sensor giving a corresponding signal to the co-ordinator (or to the controller (105c; 105d, 105e) of the first actuator).

Clause 3. A control system according to clause 1 or 2, in which the table uses a co-ordinate system containing only positions of the actuator and a Ramp Table of step-to-step times achievable by the given combination of actuator and load.

Clause 4. A control system according to any preceding clause, containing a Boolean algorithm for calculating the speed for the next step.

Clause 5. A machine including a set of actuators (5) and a control system according to any preceding clause.

Clause 6. A machine according to clause 5, further including a conveyor (10a, 10b) operated by one or more (5a, 5b) of the actuators, for moving items for processing.

Clause 7. A machine according to clause 6, including a labelling station (400; 500) for applying a label to an item, the labelling station including a supply of labels, an actuator (5c; 5e, 30) for moving a label towards and onto the item, and a controller (105c; 105e) as aforesaid for the actuator (5c; 5e).

Clause 8. A machine according to clause 7, in which the labelling station (400) also prints the labels with data pertaining to the item and to this end includes a printer (20) also under the control of the co-ordinator.

Clause 9. A machine according to clause 7 or 8, including a reciprocating applicator (30) receiving labels fed by a further actuator (5*d*) and applying them to the item.

Clause 10. A machine according to any of clauses 5 to 9, in which at least one actuator (5) has associated with it a sensor (205*a*; 205*b*; 405*c*; 405*d*; 505*e*) for ascertaining the start of the synchronisation process.

Clause 11. A machine according to any of clauses 5 to 10, in which the actuators are stepper motors.

Clause 12. A method of controlling a set of step-based actuators, such as stepper motors, to act on a load, in which a table is provided of achievable position values at each step against speed values for the actuator/load combination, and the actuators are controlled to a desired waypoint, being a desired position and speed for the actuator, by calculating a series of steps by reference to the table, each step being adjacent to the previous; and the motion of at least one actuator (5*c*) is started on the basis of the measured position of another actuator (5*a*).

Clause 13. A method according to clause 12, in which the said other actuator acts on a conveyor (10*a*) transporting food items, and the first actuator (5*c*) applies labels to the food items as they travel.

Clause 14. A method according to clause 13, in which the food items are supplied from a weighing station, and the said labels are printed with the measured weight.

Clause 15. A method according to clause 12, in which the tables are previously determined on an empirical basis.

Clause 16. A method of generating tables for use in a method according to clause 15, by measuring the achievable acceleration of the actuator at each step under a given load.

Clause 17. A method for installing or replacing step-based actuators in a machine including one or more such actuators, each controlled by a controller by reference to a ramp table of achievable speeds against steps, in particular according to any of clauses 5 to 11, wherein the characteristics of the new or exchanged actuator are ascertained and the corresponding ramp table is installed in the controller.

Clause 18. A control system for a stepper motor, comprising:
- a storage location for a table of values relating achievable speeds to positions for the motor, starting from stationary, where the positions are adjacent steps in the motor movement (e.g. rotation); and
- a controller configured to ascertain or receive the position of the motor and to receive or generate data concerning a waypoint, being a desired future position and speed for the motor;
- wherein the controller is further configured to raise, lower or maintain the speed of the motor at each step by reference to the table, in such a way that when the motor reaches the desired position it is moving (e.g. rotating) at the desired speed.

Clause 19. A controller according to clause 18, in which the controller is further configured to slew the motion of the motor when approaching a waypoint at which a speed below the maximum is demanded, preferably so as to minimise the time taken to reach the waypoint.

Clause 20. A controller according to clause 18 or 19, in which the table uses a co-ordinate system containing only positions of the motor and a Ramp Table of step-to-step times achievable by the given combination of motor and load.

Clause 21. A controller according to any of clauses 18 to 20, wherein the speeds range from zero to a specified maximum, and if a specified speed cannot be reached then the maximum is used.

Clause 22. A controller according to any of clauses 18 to 21, containing a Boolean algorithm for calculating the speed for the next step.

Clause 23. A stepper motor in combination with a controller according to any of clauses 18 to 22.

The invention claimed is:

1. A control system for coordinating movement of a set of actuators each configured to operate in discrete steps to carry out movement in a machine, the control system, comprising:
- a controller for each actuator, containing a table of values relating times taken to reach each successive step for each actuator during acceleration and deceleration, for loads within capacity of the actuator; and
- a coordinator configured to determine or receive a position of each actuator and to receive or generate data concerning a waypoint, being positions and corresponding speeds for the actuators;
- wherein the controllers are further configured to raise, lower or maintain the speeds of the actuators at each step by reference to the respective tables, by calculating a number of steps each actuator must travel to reach the waypoint and by raising, lowering or maintaining respective speeds to ensure each actuator is moving at a desired speed at the waypoint, and
- wherein also the coordinator is configured to start the movement of at least one actuator on the basis of a point reached by another actuator, so that both actuators reach the waypoint at a same time.

2. The control system according to claim 1, further comprising at least one sensor for ascertaining the position of the other actuator, or of an item moved by said other actuator, the sensor being configured to send a corresponding signal to the coordinator, or to the controller of a first actuator of the at least one actuator.

3. The control system according to claim 1, in which the table contains only positions of the actuator and step-to-step times achievable by the actuator.

4. A machine including a set of actuators and a control system according to claim 1.

5. The machine according to claim 4, further including a conveyor operated by one or more of the actuators, for moving items for processing.

6. The machine according to claim 5, including a labelling station for applying a label to an item, the labelling station including a supply of labels, an actuator for moving a label towards and onto the item, and a controller for the actuator.

7. The machine according to claim 6, in which the labelling station comprises a printer, under the control of the coordinator, configured to print the labels with data pertaining to the item.

8. The machine according to claim 4, in which at least one actuator has a sensor configured to ascertain the start of a synchronization process.

9. The machine according to claim 4, in which the actuators are stepper motors.

10. A method of controlling a set of step-based actuators to act on respective loads and to operate in discrete steps to carry out movement in a machine, in which, for each actuator, a table is provided of values relating times taken to reach each successive step for each actuator during acceleration and deceleration, for loads within a capacity of the actuator and the actuators are controlled to a desired waypoint, being a desired position and speed for the actuator, by calculating a series of steps by reference to the table, each step being adjacent to the previous step; and wherein motion of at least one actuator is started on the basis of a measured position of another actuator, wherein both actuators reach the waypoint at a same time.

11. The method according to claim 10, in which the other actuator acts on a conveyor transporting food items, and a first actuator of the at least one actuator applies labels to the food items as the food items travel on the conveyor.

12. A method for installing or replacing step-based actuators in a machine including one or more such actuators, each controlled by a controller by reference to a ramp table of achievable speeds against steps, according to claim 4,
wherein characteristics of a new or exchanged actuator are ascertained and a corresponding ramp table is installed in the controller.

13. A control system for a stepper motor, comprising:
a storage location for a table of values relating achievable speeds to positions for the motor, starting from stationary, where the positions are adjacent steps in motor movement; and
a controller configured to ascertain or receive the position of the motor and to receive or generate data concerning a waypoint, being a desired future position and speed for the motor;
wherein the controller is further configured to raise, lower or maintain the speed of the motor at each step by reference to the table in such a way that the motor is moving at the desired speed when the motor reaches the desired position;
wherein the controller is connected to a coordinator configured to start the movement of at least motor on the basis of a point reached by another motor, so that the motor reaches the waypoint at a same time as the other motor.

14. The controller according to claim 13, in which the controller is further configured to slew the motion of the motor when approaching a waypoint at which a speed below the maximum is demanded, to minimize the time taken to reach the waypoint.

15. The controller according to claim 13, in which the table uses a coordinate system containing only positions of the motor and step-to-step times achievable by a given combination of motor and load, wherein the speeds range from zero to a specified maximum, and if a specified speed cannot be reached then the maximum is used.

* * * * *